United States Patent [19]

Nienstedt

[11] Patent Number: 4,934,237
[45] Date of Patent: Jun. 19, 1990

[54] APPLIANCE AND PROCESS FOR DIVIDING ESPECIALLY DEEPFROZEN FOOD BLOCKS, SUCH AS FISH

[76] Inventor: Heinz Nienstedt, Zum Nonnenberg 8a, D-4250 Recklinghausen, Fed. Rep. of Germany

[21] Appl. No.: 148,792

[22] Filed: Jan. 27, 1988

[30] Foreign Application Priority Data

Jan. 28, 1987 [DE] Fed. Rep. of Germany ....... 3702444
Feb. 27, 1987 [DE] Fed. Rep. of Germany ....... 3706337
Apr. 22, 1987 [DE] Fed. Rep. of Germany ....... 3713421

[51] Int. Cl.$^5$ .................................................. A22C 25/18
[52] U.S. Cl. ........................................ 83/865; 83/862; 83/875; 83/27; 83/49; 83/102; 83/407; 83/425.3; 51/206 R
[58] Field of Search ................. 83/861, 862, 863, 865, 83/875, 879, 27, 49, 52, 102, 105, 404, 407, 425.3, 165, 835; 125/15; 51/206 R

[56] References Cited

U.S. PATENT DOCUMENTS

| | | | |
|---|---|---|---|
| 334,440 | 1/1886 | Ireland | 83/835 |
| 360,813 | 4/1887 | Moore | 83/835 |
| 1,582,027 | 4/1926 | Dunbar | 83/425.3 |
| 2,609,049 | 9/1952 | Rayburn | 83/863 |
| 2,941,560 | 6/1960 | McCaffery | 83/407 |
| 3,079,964 | 3/1963 | Oldershaw | 83/407 |
| 3,196,917 | 7/1965 | Frank | 83/865 |
| 3,229,736 | 1/1966 | Hallock | 83/835 |
| 3,526,999 | 9/1970 | Jägers | 125/15 |
| 4,058,150 | 11/1977 | Pennington | 83/862 |
| 4,733,437 | 3/1988 | Nienstedt | 83/425.3 |

Primary Examiner—Douglas D. Watts
Assistant Examiner—Scott A. Smith
Attorney, Agent, or Firm—Sprung Horn Kramer & Woods

[57] ABSTRACT

The invention relates to a severing appliance for dividing especially deep-frozen fish. The severing appliance consists of several disc-shaped severing blades 3 which are arranged parallel and next to one another above the supporting surface 6 of a platform 1 and the peripheral margin 5 of which is arranged at such a short distance from the supporting surface 6 that the blocks 15 fed by forward-pushing means 16, 17 are for the greater part severed, with the exception of thin webs 19. For the severing of the webs 19, the severing blades are followed by severing elements 8 arranged in a stationary manner and perfectly aligned with the severing blades 3. Even in blocks of differing local hardness, such an appliance carrying out the severing operation in two stages ensures faultless transport of the severed smaller units. The severing blades used are preferably blades which taper towards the outer margin and at the outer margin are radially upset to form double collars, the outer face forming a sharp cutting edge and the severing blades consist of hardened steel at least in the region of the outer margin. Such blades can be produced at a low outlay and minimize the cutting loss.

11 Claims, 3 Drawing Sheets

APPLIANCE AND PROCESS FOR DIVIDING ESPECIALLY DEEPFROZEN FOOD BLOCKS, SUCH AS FISH

BACKGROUND OF THE INVENTION

The invention relates to a severing appliance consisting of several severing blades in circular-disc form which are held next to and at a distance from one another on a drive shaft between clamping flanges and are intended for dividing especially deep-frozen food blocks, such as fish, and which each taper radially towards the outer margin and at the outer margin have a double collar with a sharp-edged surface.

In such severing appliances, not only a long service life, but also a small cutting width is required, because the loss of material as a result of the chipping of the material at the cutting points should be as low as possible. So that the thin severing elements in circular-disc form, used for this reason and not having a high inherent stability when they leave the factory, can be made rigid, it is known to clamp the severing blades between flanges, with the exception of a relatively narrow outer margin. The outer margin of the severing blades which is designed as a double collar and which serves as a cutting edge has a sharp-edged surface formed by glued-on diamond particles (DE 3,512,488 C2).

It has been possible to achieve good cutting results with such a known severing appliance. However, a disadvantage of this severing appliance is the high outlay involved in producing the severing elements.

The requirement for as low a cutting loss as possible has also already been met to a satisfactory degree in the abovementioned state of the art, because, in contrast to other known appliances, the severing blades do not pass from below through the platform via which the block is fed to the severing blades for dividing, but are arranged above the platform which is made continuous. This prevents the waste unavoidable during the dividing operation from escaping underneath the platform and being lost. Since the waste remains above the platform, it is possible to capture it and feed it once again to the smaller units. Furthermore, when the severing blades are arranged above the platform, it is possible to make the severing blades relatively thin and give them sufficient rigidity by clamping them between flanges, with the exception of a margin corresponding to the thickness of the blocks (DE 35 12 488 C2 and DE 35 27 620 C2).

It has been shown, in practice, that, during the division of the blocks, there can be irregularities in as much as, as a result of local hardening in the block, the severing blades are distorted and tear relatively large pieces out of the block. It can happen, furthermore, that smaller units leave the cutting, region at an increased speed and become misshaped as a result of impact and/or disrupt further transport.

SUMMARY OF THE INVENTION

The object on which the invention is based is to provide, for a severing appliance of the type mentioned in the introduction, severing blades which, whilst having a good cutting capacity and a long service life, do not require a high outlay in terms of production in comparison with the known severing blades and, if possible, result in a lower cutting loss.

According to the invention, in a severing appliance of the type mentioned in the introduction, this object is achieved because each severing blade, of which the double collar radially upset at its outer margin is provided, in its peripheral outer face, with an embossing forming the sharp-edged surface, consists of hardened steel at least in the region of the outer margin. The embossing is preferably a knurling.

The use of such a severing appliance has exceeded all expectations where the cutting capacity and service life are concerned. Its outlay in terms of production is low because the double collar with its sharp-edged surface can be produced by simple mechanical machining of the conically tapering margin. The production outlay for this mechanical surface machining and the hardening of the margin is considerably less in comparison with a severing blade having diamond chips attached to it. Finally, the severing blade according to the invention has a high inherent stability as a result of its shaping.

So that blocks of differing hardness can be cut perfectly by means of an appliance of the type mentioned in the introduction, which may be equipped with the severing blades according to the invention or other severing blades, the severing blades are according to one embodiment of the invention, arranged with their peripheral margin at such a short distance from the supporting surface of the platform that the block is for the greater part severed, with the exception of thin webs, and arranged behind the severing blades in the direction of transport of the block are severing elements which are perfectly aligned with these and bridge the gaps between the receiving surface and the margins of the severing blades arranged at a distance from this, and which are intended for severing the webs.

Since, in the invention, there is no complete severing of the block into smaller units in the region of the severing blades, the smaller units now only connected via the thin webs leave the region of the severing blades as a continuous unit. Only in the region of the severing elements arranged outside the effective range of the severing blades does complete severing take place. Consequently, individual units where the severing blades strike harder places cannot be catapulted out of the region of the severing blades by the latter. Damage to the smaller units and disruption of further transport are effectively prevented in this way.

It has proved expedient for further transport if the supporting surface for the severed smaller units merges into transport tracks which are offset relative to one another in terms of height and which are perfectly aligned with the interspaces between the severing blades. The height offset between the smaller units adjacent to one another prevents the units from freezing together again after being severed.

It is also advantageous, in the invention, if, as is known per se, holding-down devices for the severed blocks are provided behind the severing blades in the direction of transport and above the supporting surface and/or the transport tracks. The holding-down devices can be designed with their parts taking effect on the blocks or smaller units as rollers offset relative to one another.

In terms of the process, faultless operation with the special severing blades according to the invention or with other severing blades in circular-disc form can be achieved if the block is severed, with the exception of thin webs, by means of the severing blades and if the webs are severed by following severing elements, the severing of the webs starting even when the block is still being severed by means of the severing blades.

The invention is explained in detail below with reference to a drawing illustrating an exemplary embodiment. In particular:

DETAILED DESCRIPTION OF THE INVENTION

Figure 1:
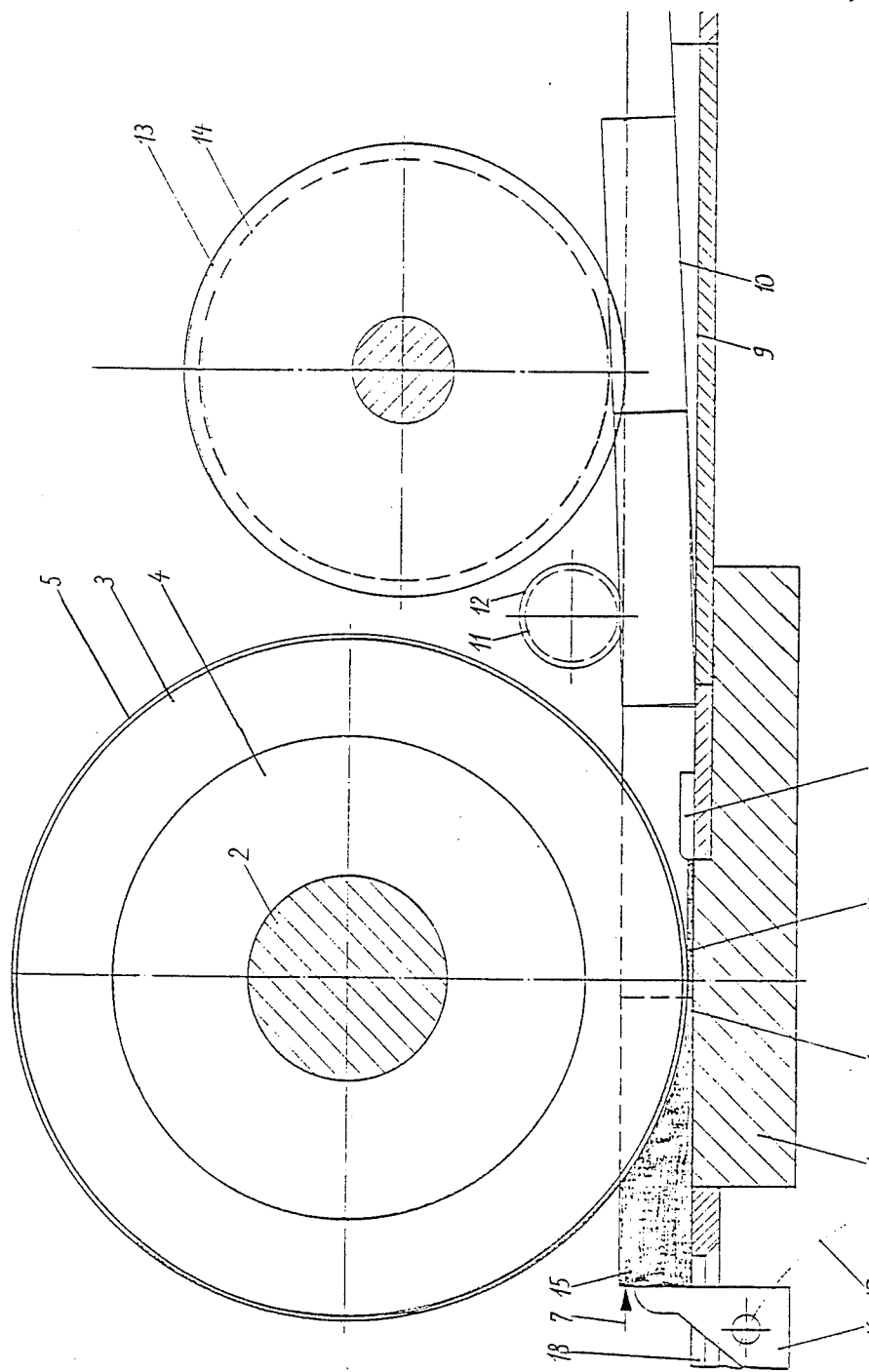
FIG. 1 shows, in a diagramatic representation, a side view of an appliance for severing blocks.
Figure 2:
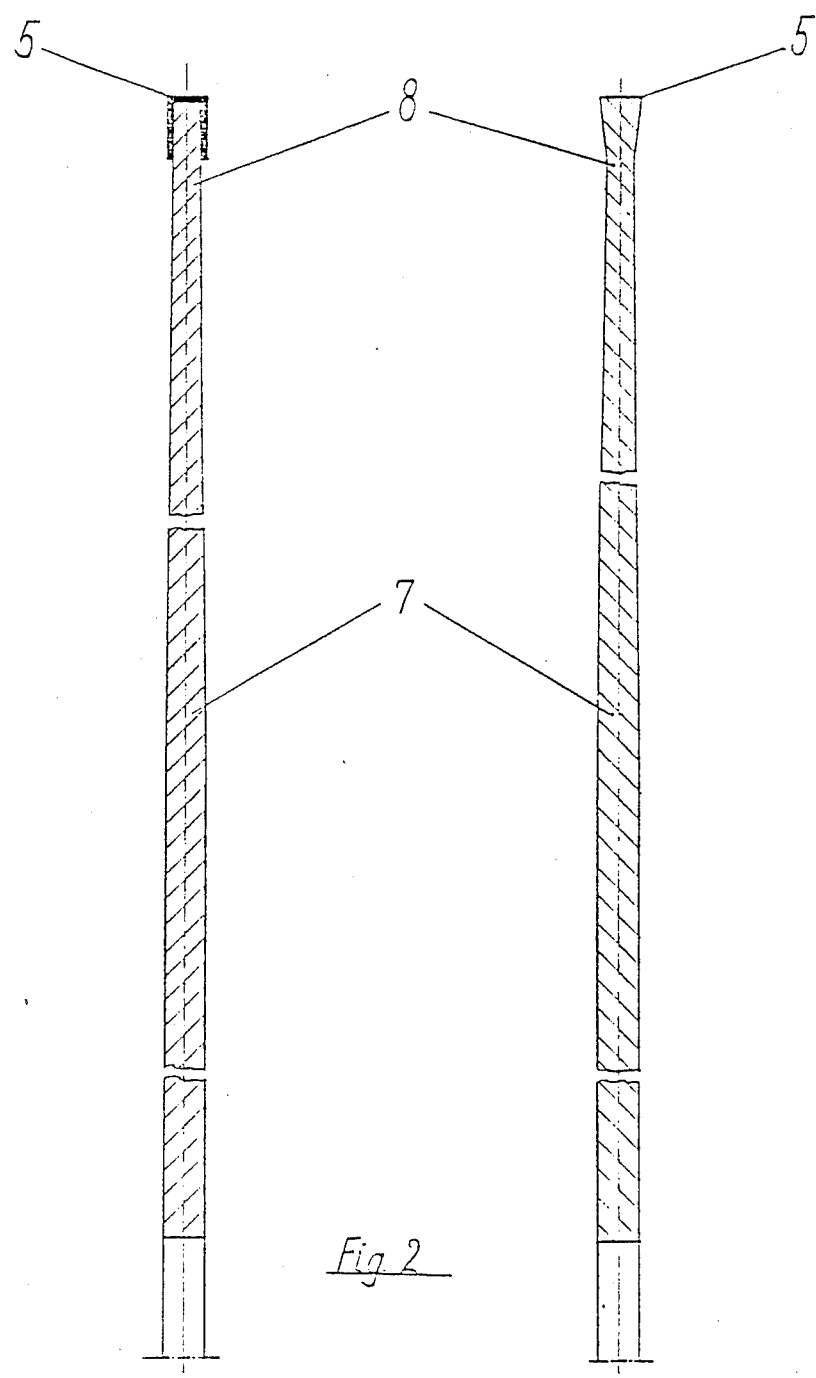
FIGS. 2a and 2b shows two alternative versions of a severing blade in an axial half-section.

In the appliance according to FIG. 1, above a platform 1 several severing blades 3 in circular-disc form are arranged clamped on a driver shaft 2 at a distance from one another between stiffening flanges 4. The peripheral margin 5 of each severing blade 3 is arranged at a short distance from the supporting surface 6 of the platform 1. A severing element 8 reaching to the supporting surface 6 and in the form of a wedge-shaped knife is arranged immediately behind each severing blade 3 and in line with the latter. The supporting surface 6 is followed by transport tracks 9, 10 which are offset in terms of height and the width of which corresponds to the distance between the severing blades 3, and which are aligned with the interspaces between the severing blades 3. A smaller set of rollers 11, 12 and a larger set of rollers 13, 14 are arranged in succession on each of these transport tracks 9, 10. The rollers 11, 12, 13, 14 are assigned to the individual transport tracks 9, 10. As a result of the different diameters of the individual rollers 11, 12, 13, 14, the height offset of the transport tracks 9, 10 is compensated for so that the rollers 11, 12, 13, 14 are at the same distance from the supporting surface of the transport tracks 9, 10. The severing blades 3 have the designs shown in FIGS. 2a and 2b. They merge via a conical annular portion 3a, 3b into the relatively thin outer region 3a, 3b which, in the exemplary embodiment shown in FIG. 2a, is covered with diamond powder at its peripheral margin 5a and on an annular region adjoining this on both sides of the severing blade 3a and, in the exemplary embodiment shown in FIG. 2a, is upset radially from outside at its peripheral margin 5b for example knurled or provided with upset teeth. In both cases, the severing blade 3a, 3b can therefore operate with a chip-removing effect.

The mode of operation of the appliance is as follows:
Drivers 16 arranged on a rotating transport chain 17 and passing through a grid-like platform 18 from below engage behind cuboid blocks or plates 15, to be divided, at their rear edge and push them forwards. As shown in FIG. 1, the severing blades 3 do not sever the plates 15 completely, but leave thin webs 19. These thin webs 19 are severed by the following severing elements 8 shaped as knives, the shape of which is evident from FIG. 1. During this complete severing, the individual smaller units thus obtained are offset in terms of height in the region of the transport tracks 9, 10. At the same time, the rollers 11, 12, 13, 14 acting as holding-down devices ensure that this height offset and further transport occur without fault. Because of the remaining webs 19, the blocks and/or smaller units continue to be under control over the entire region, that is to say also in the region of the severing blades 3. It is no longer possible for individual pieces to be thrown out.

Figure 3:
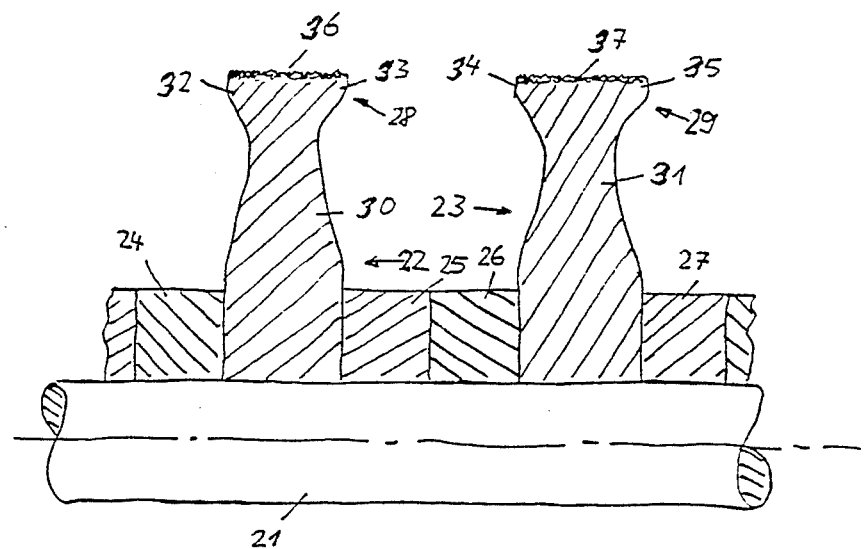
FIG. 3 shows, in an axial half-section, two severing arranged on a drive shaft.

In the exemplary embodiment of FIG. 3 preferred for production reasons and because of the lower cutting loss, steel severing blades 22, 23 in circular-disc form are arranged at a distance from one another on a drive shaft 21 located above a platform (not shown), over which the blocks to be divided are transported. The severing blades 22, 23 are clamped between flanges 24, 25, 26, 27 and retained on the drive shaft 21. The proportions in the drawing are distorted. In actual fact, the severing blades are more slender and the flanges 24 to 27 reach further towards the outer margin 28, 29 of their severing blades 22, 23, in order to give them a sufficient inherent stability, as shown in the exemplary embodiment of FIGS. 1 and 2.

Each severing blade 22, 23 tapers radially towards its outer margin 28, 29. The tapering region 30, 31 is upset radially, with the result that a collar 32, 33, 34, 35 is formed at the outer margin 28, 29 on both sides of each severing blade 22, 23. The width of these double collars 32, 33 and 34, 35 corresponds to the width of the severing blade 22, 23 in the clamping region. The peripheral cylindrical outer face 36, 37 of the severing blade 22, 23 has an embossing, especially a knurling, which makes the surface sharp-edged. Each severing blade 22, 23 made of steel is hardened at least in its tapered region 30, 31 and at the outer margin 28, 29.

By means of the severing blades 22, 23 according to the invention, because of the hardened sharp-edged surface, deep-frozen fish can be divided with a loss of material which is unavoidable because of the removal of chips in the cutting region, but which is only very low.

I claim:
1. A severing appliance for dividing frozen food blocks, comprising:
    a platform having a supporting surface for slidably receiving a block to be divided:
    a plurality of circular disk cutting blades having a radially outermost peripheral margin;
    means rotatably mounting the circular disk cutting blades parallel to and spaced apart from each other above the platform with the radially outermost peripheral margin a short distance above the supporting surface to effect a less than complete severing of a block by each rotatable circular disk cutting blade thereby forming block sections with connecting webs therebetween and aligned with the rotatable circular disk cutting blades;
    means for sliding a block to be divided on the supporting surface in a transport direction parallel to an towards the rotatable circular disk cutting blades, and
    stationary non-rotatable severing elements disposed downstream of and aligned with the rotatable circular disk cutting blades with respect to the transport direction to cut the connecting webs to thereby completely sever the block sections from each other and to avoid acceleration of the block sections in the transport direction due to rotation of the circular blades.

2. The severing appliance according to claim 1, wherein the severing elements comprise stationary knives projecting upwardly from the supporting surface.

3. The severing appliance according to claim 1, further comprising transport tracks downstream of the supporting surface in the transport direction and aligned with spaces between the rotatable circular disk cutting blades and wherein the tracks are offset relative to each other with respect to height.

4. The severing appliance according to claim 1, further comprising severed block section hold down means downstream of the rotatable circular disk cutting blades and above the supporting surface.

5. The severing appliance according to claim 3, further comprising severed block section hold down means downstream of the rotatable circular disk cutting blades and above the supporting surface and above at least one of the supporting surface and transport tracks.

6. The severing appliance according to claim 5, wherein the hold down means comprise rollers above the transport tracks and offset relative to each other with respect to height.

7. The severing appliance according to claim 1, wherein each disk tapers radially toward the peripheral margin and wherein the peripheral margin has a double collar with a sharp-edged surface and wherein the double collar is radially upset with an embossing forming the sharp-edged surface and consisting of hardened steel.

8. The severing appliance according to claim 7, wherein the embossing is a knurling.

9. A process for dividing frozen food blocks, comprising:

forming block sections with connecting webs therebetween by sliding a block to be divided in a transport direction on a supporting surface and into a plurality of rotating circular disk cutting blades which are disposed above the supporting surface parallel to and spaced apart from each other and with outermost peripheral margins thereof disposed a short distance above the supporting surface whereby the block sections are aligned with spaces between the rotating circular disk cutting blades and the web portions are aligned with the rotating circular disk cutting blades; and completely severing the block sections from each other by transporting the connected block sections downstream of the rotating circular disk cutting blades in the transport direction past stationary non-rotatable severing elements aligned with the rotating circular disk cutting blades thus avoiding acceleration of the block sections in the transport direction due to rotation of the circular blades.

10. The process according to claim 9, wherein the blocks sections are completely severed by knives projecting upwardly from the supporting surface.

11. The process according to claim 9, further comprising transporting the severed block sections at offset heights relative to each other.

* * * * *